United States Patent
Bergstrom et al.

(10) Patent No.: US 6,820,900 B1
(45) Date of Patent: Nov. 23, 2004

(54) REAR AXLE ARRANGEMENT FOR A HEAVY VEHICLE

(75) Inventors: Ake Bergstrom, Mariefred (SE); Pär Wallin, Järna (SE); Michael Linden, Södertälje (SE); Fredrik Modahl, Norsborg (SE); Anders Gustavsson, Gnesta (SE); Geoffrey Davidson, North Yorkshire (SE)

(73) Assignee: Scania CV AB (PUBL) (SE)

( * ) Notice: Subject to any disclaimer, the term of this patent is extended or adjusted under 35 U.S.C. 154(b) by 34 days.

(21) Appl. No.: 10/089,639

(22) PCT Filed: Sep. 28, 2000

(86) PCT No.: PCT/SE00/01876

§ 371 (c)(1),
(2), (4) Date: Aug. 7, 2002

(87) PCT Pub. No.: WO01/23244

PCT Pub. Date: Apr. 5, 2001

(30) Foreign Application Priority Data

Sep. 29, 1999 (SE) .............................................. 9903520

(51) Int. Cl.[7] .............................................. B62D 21/12
(52) U.S. Cl. ...................................... 280/785; 280/788
(58) Field of Search ................................ 280/781, 785, 280/787, 788, 789, 124.135, 124.136, 124.145, 407.1, 411.1, 149.1, 797; 180/55, 56, 58, 291, 295, 299, 312; 105/4.2

(56) References Cited

U.S. PATENT DOCUMENTS

| 3,243,007 | A | * | 3/1966 | Berckhan ..................... 180/256 |
| 3,918,736 | A | * | 11/1975 | Hickman ..................... 280/676 |
| 4,811,812 | A | * | 3/1989 | Cassese ...................... 180/295 |
| 4,813,704 | A | * | 3/1989 | Smith ................... 280/124.109 |
| 4,955,629 | A | * | 9/1990 | Todd et al. .................. 280/407 |
| 5,538,274 | A | * | 7/1996 | Schmitz et al. ....... 280/124.142 |
| 5,833,026 | A | * | 11/1998 | Zetterstrom et al. ........ 180/360 |
| 5,860,668 | A | * | 1/1999 | Hull et al. .................. 280/408 |
| 5,882,064 | A | * | 3/1999 | Emmons ................. 296/193.04 |
| 6,193,273 | B1 | * | 2/2001 | Novak et al. ............... 280/781 |

FOREIGN PATENT DOCUMENTS

EP        0295661        12/1988

* cited by examiner

*Primary Examiner*—David R. Dunn
(74) *Attorney, Agent, or Firm*—Ostrolenk, Faber, Gerb & Soffen, LLP

(57) ABSTRACT

The invention relates to a rear axle arrangement for a heavy vehicle, e.g. a freight vehicle. The vehicle incorporates a number of wheels which bear the vehicle and an elongate chassis element which extends in the longitudinal direction of the vehicle. The rear axle arrangement incorporates at least one separate rear axle unit which includes a loadbearing frame structure and two of said wheels. The frame structure extends between a first end region and a second end region in the longitudinal direction of the vehicle and the first end region of the frame structure is designed to be connected to the elongate chassis element. In addition, the two wheels are suspended on the frame structure.

12 Claims, 4 Drawing Sheets

REAR AXLE ARRANGEMENT FOR A HEAVY VEHICLE

BACKGROUND TO THE INVENTION, AND STATE OF THE ART

The present invention relates to a rear axle arrangement for a heavy vehicle and particularly to a frame of the arrangement and its connection to the vehicle chassis.

Heavy vehicles, which here means, for example, trucks, buses and similar freight and utility vehicles, incorporate according to conventional technology a longitudinal chassis element in the form of two frame side members which are connected to one another by means of a number of cross-members. The frame side members extend parallel with one another along substantially the whole length of the vehicle and support vehicle components such as the engine, the driver's cab and a load surface which takes the form, for example, of a load platform or a superstructure. In addition, the vehicle's front and rear axles are suspended in the frame side members.

In heavy vehicles such as tucks, the frame side members and the cross-members act as main loadbearing parts of the vehicle in order to achieve strength and rigidity. In heavy vehicles such as buses, the bodywork also contributes to vehicle rigidity and strength. Conventionally designed support devices are nevertheless built so as to be relatively unresistant to bending and torsion in order to be able to cope with heavy loads and varying road conditions, comprising a complete range from forest roads or no roads to smooth motorways. Relatively low resistance to bending and torsion does entail, however, certain problems with regard to riding comfort and vehicle running characteristics. The chassis element having relatively low resistance to torsion and the wheel axles being made of steel result in not entirely sadly riding comfort, particularly on long journeys and on good roads. Nor is it possible for riding comfort and vehicle running characteristics to be improved to any appreciable extent by more sophisticated suspension systems. As heavy vehicles are to an ever increasing extent travelling on smooth roads, riding comfort and vehicle running characteristics are an increasingly important factor. In addition to riding comfort being naturally advantageous for the vehicle's driver and passengers, it is also important to reduce the amount of damage to freight, particularly when carrying goods which are easily damaged. Conventional frame side members and steel wheel axles result in any road surface unevenness being propagated in the chassis element and having adverse effects on substantially the whole vehicle.

The conventional superstructure of a heavy vehicle also has the disadvantage of its manufacture being relatively expensive because such a design involves many different components which cannot be standardised for different vehicle variants. For example, the vehicle's front and rear axle arrangements may involve many different components depending on whether the respective wheels are to be steerable or not, powered or not, how many rear axles the vehicle is to have, the type of suspension, etc. Such a conventionally constructed heavy vehicle also requires a relatively large amount of assembly work.

DE-A-4322716 describes a vehicle chassis for heavy-duty vehicles. The chassis incorporates a rear axle arrangement, a box-like central chassis element and a front axle arrangement. The rear and front axle arrangements are of conventional design in that they incorporate two longitudinal frame members which are connected to one another by means of cross-members. The wheel suspension seems to incorporate a steel wheel axle and the forces acting upon the wheels will be led on into the central tunnel-like chassis element.

SUMMARY OF THE INVENTION

The object of the present invention is to provide a rear axle arrangement which constitutes a substantially self-supporting unit, i.e. which can absorb the forces acting upon the rear wheels and which contributes to better vehicle running characteristics.

A further object of the present invention is to provide a rear axle arrangement which incorporates simple standardised components which are easy to fit and readily available, so that repair work and servicing operations can be performed easily and quickly.

These objects are achieved with the rear axle arrangement indicated in the introduction, which is characterised in that the rear axle arrangement incorporates at least one separate rear axle unit which itself incorporates a loadbearing frame structure and two of said wheels, said frame structure extends between a first end region and a second end region in said longitudinal direction and said first end region of said frame structure is designed to be connected to said elongate chassis element, and that said two wheels are suspended on said frame structure.

The rear axle arrangement thus incorporates a separate unit which includes a frame structure, i.e. a framelike structure, on which two rear wheels are suspended. For major repair work, the rear axle unit can easily be disassembled from the elongate chassis element and be replaced by another rear axle element, thus avoiding the vehicle being stationary in a workshop. Replacing one rear axle unit by another is a simple operation and need not take up valuable time.

According to a further embodiment of the invention, said frame structure forms a space which extends through the frame structure in said longitudinal direction. The framelike structure thus exhibits a cavity which extends in the longitudinal direction of the vehicle.

According to a further embodiment of the invention, the frame structure incorporates two side portions which are situated at a distance from one another, extend in said longitudinal direction and are connected to one another by means of an upper portion and by means of at least one lower portion in such a way that said portions form said space between them. The result is a tunnel-like structure or may be likened to a boxlike structure which is open at both of its ends arranged in the longitudinal direction of the vehicle, extends in the longitudinal direction of the vehicle and is capable of absorbing at least substantially all the vertical forces which act upon the rear wheels.

According to a further embodiment of the invention, said portions, as viewed in the longitudinal direction of the vehicle, form a substantially quadrilateral frame round said space. The result is a frame structure which has high rigidity and strength.

According to a further embodiment of the invention, each side portion has a lower section and an upper section, and each of the lower sections is of greater extent in said longitudinal direction than the respective upper section. In addition, said side portions may be connected to one another by two lower portions, in which case the first lower portion is arranged adjacent to the first end region of the frame structure and the second lower portion is arranged adjacent to the second end region of the frame structure. Said positioning of the lower portions results in a frame structure which has high rigidity and strength.

According to a further embodiment of the invention, said two wheels are individually suspended in said frame structure. This improves the vehicle's riding comfort and running characteristics in that vertical forces acting upon a rear wheel of the vehicle will be absorbed by the frame structure and will not affect other parts of the vehicle. According to a preferred embodiment of the invention, each of said two wheels is suspended by means of a lower link arm and an upper link arm which are pivotingly connected to the frame structure. In addition, both the lower link arms and the upper link arms are pivotingly connected to respective said side portion. The rear axle unit also incorporates a spring device for each wheel, and each spring device is connected to the upper portion of the frame structure and a lower link arm.

According to a further embodiment of the invention, said war axle unit forms a substantially self-supporting rear axle module, and any desired number, preferably two or three, of such rear axle modules may be connected to one another via said frame structures. The rear axle unit thus forms a self-supporting module. One rear axle arrangement can only incorporate one such module, but it is also possible to connect two or more such modules, in which case each module is self-supporting.

According to a further embodiment of the invention, said wheels are powered and a differential gear is arranged in said frame structure. With advantage, said differential gear is arranged in said space, in which case not only does each of said side portions incorporate an aperture but a respective driveshaft also extends from the respective wheel through said aperture to said differential gear. Said space extending through the frame structure in the longitudinal direction of the vehicle, i.e. the frame structure forming a hollow structure in the longitudinal direction of the vehicle, makes it easy for the differential gear to be arranged and fitted in said frame structure, either from the first end region of the frame structure or from the second end region of the frame structure, before the first end region of the rear axle unit is connected to the elongate chassis element of the vehicle. Situating the differential gear in said space provides a flexible and compact solution. The differential gear is itself connected to the vehicle's engine via a gearbox and a driveshaft. The gearbox and driveshaft are situated in the vehicle's elongate chassis element in the vicinity of said frame structure.

According to a further embodiment of the invention, said rear axle unit incorporates a towbar which is directly connected to said frame structure. The towbar, which is designed to make it possible to attach trailer vehicles to said vehicle, is thus directly connected to the rear axle unit, thereby avoiding multi-stage power transmission. This is possible because the frame structure of the rear axle unit is so constructed as to exhibit high rigidity and strength.

According to a further embodiment of the invention, said rear axle unit incorporates a coupling device for attaching a trailer vehicle. Thus, like the towbar, said coupling device is also designed to make it possible to attach a trailer. What is referred to here, however, is a coupling device in the form of a turntable which is designed to make it possible to attach trailers which only have a rear axle arrangement. According to a preferred embodiment, said coupling device constitutes said upper portion which connects the side portions of the frame structure.

BRIEF DESCRIPTION OF THE DRAWINGS

The present invention will now be explained on the basis of embodiments described by way of examples with reference to the attached drawings.

DETAILED DESCRIPTION OF EMBODIMENTS OF THE INVENTION

Figure 1:
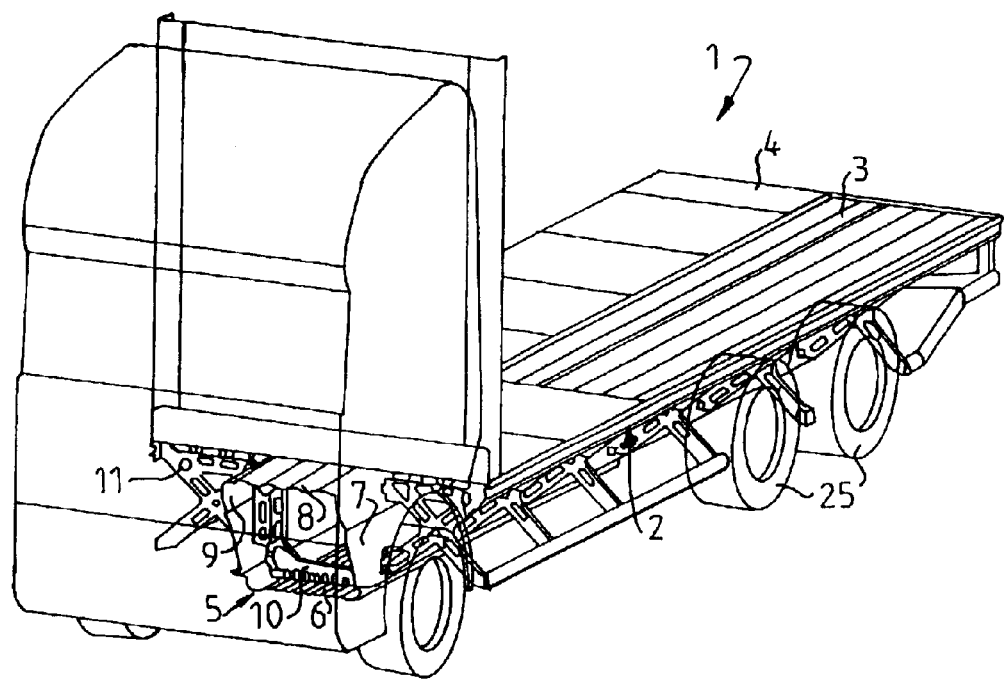
FIG. 1 shows a perspective view of a heavy vehicle.

FIG. 1 depicts schematically a heavy vehicle 1 in the form of a truck which incorporates a load surface 2 which consists of a corrugated metal sheet 3 and panels 4 arranged on the metal sheet 3. Although the invention will be described below in connection with a truck, it should be noted that the invention is also applicable to other types of heavy vehicle, e.g. buses.

The vehicle 1 incorporates an elongate chassis element 5 which extends in the longitudinal direction x of the vehicle 1. As may be seen in FIG. 1, said elongate chassis element 5 is hollow and incorporates four walls 6, 7, 8, 9 which extend along the whole length of the chassis element 5. The walls 6, 7, 8, 9, as viewed in the longitudinal direction x of the vehicle 1, form a substantially quadrilateral frame round said hollow. The walls 6, 7, 8, 9 are made of relatively thin sheetmetal and the chassis element 5 incorporates a number of support frames 10 which have a central aperture and are distributed along the length of the chassis element 5. FIG. 1 shows only one such support frame 10. On each side of the chassis element 5, outside each support frame 10, there is a support device 11 which is connected to the support frames 10 by means of bolts mining through (not depicted). The corrugated metal sheet 3 and the panels 4 rest on the chassis element 5 and the support devices 11.

Figure 2:
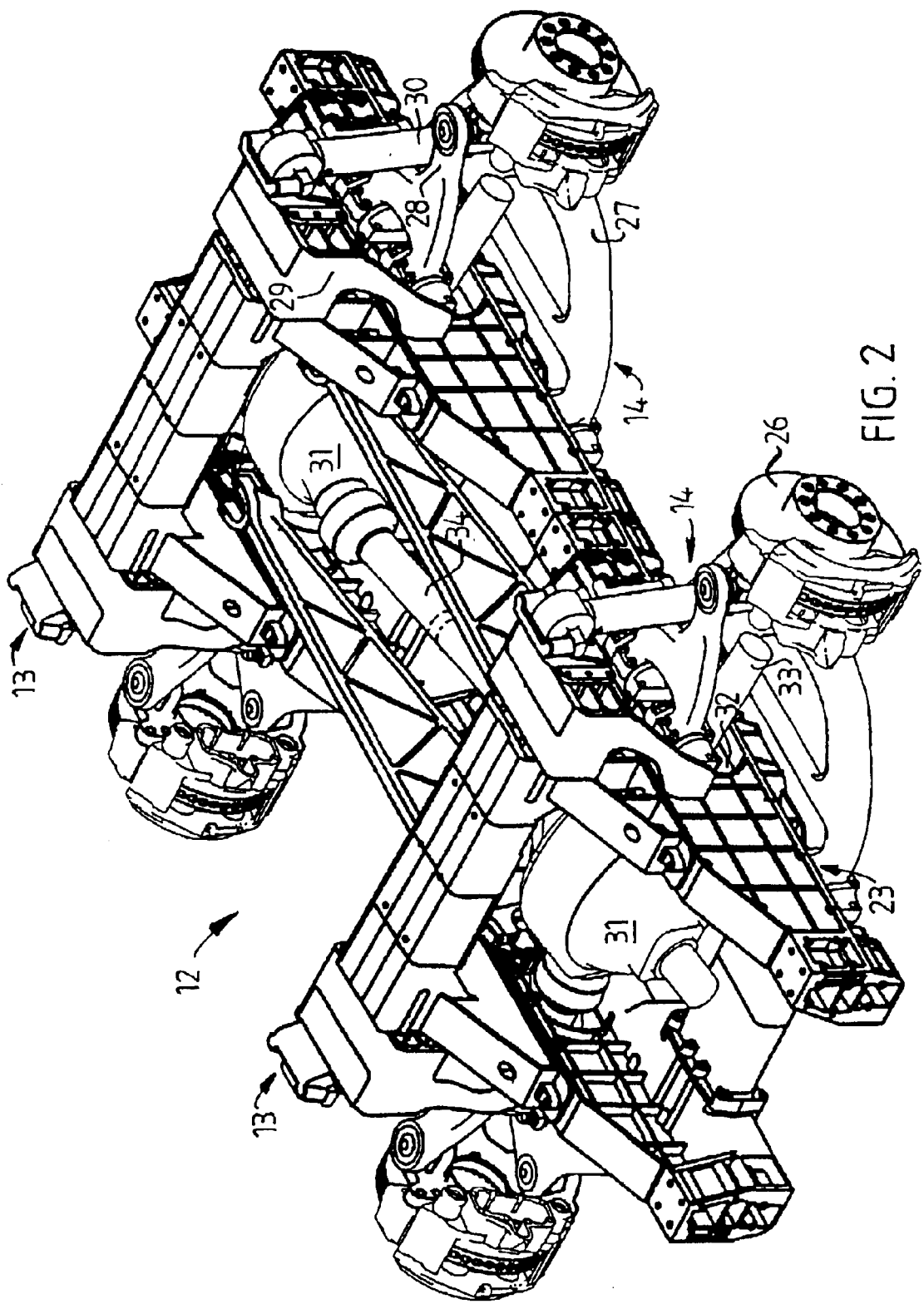
FIG. 2 shows a perspective view of a rear axle arrangement incorporating two rear axle units.

The present invention relates to the rest axle arrangement of the vehicle 1 and FIG. 2 depicts an embodiment of a rear axle arrangement which is designed to be connected to the vehicle's chassis element 5.

As indicated in FIG. 2, the rear axle arrangement 12 incorporates in this embodiment two rear axle units 13 which are directly connected to one another, e.g. by bolts running through (not depicted). Each rear axle unit 13 forms a self-supporting module. It should be noted that the rear axle arrangement 12 may incorporate any desired number of modules, i.e. rear axle units 13, preferably one, two or three, and if the rear axle arrangement incorporates two or more rear axle units these rear axle units may be connected directly to one another. Each rear axle unit 13 incorporates a structure 14 and two wheels (not depicted, although one of the wheels of each rear axle unit is depicted in FIG. 1, with reference notation 25) which are suspended on the frame structure 14.

Figure 3:
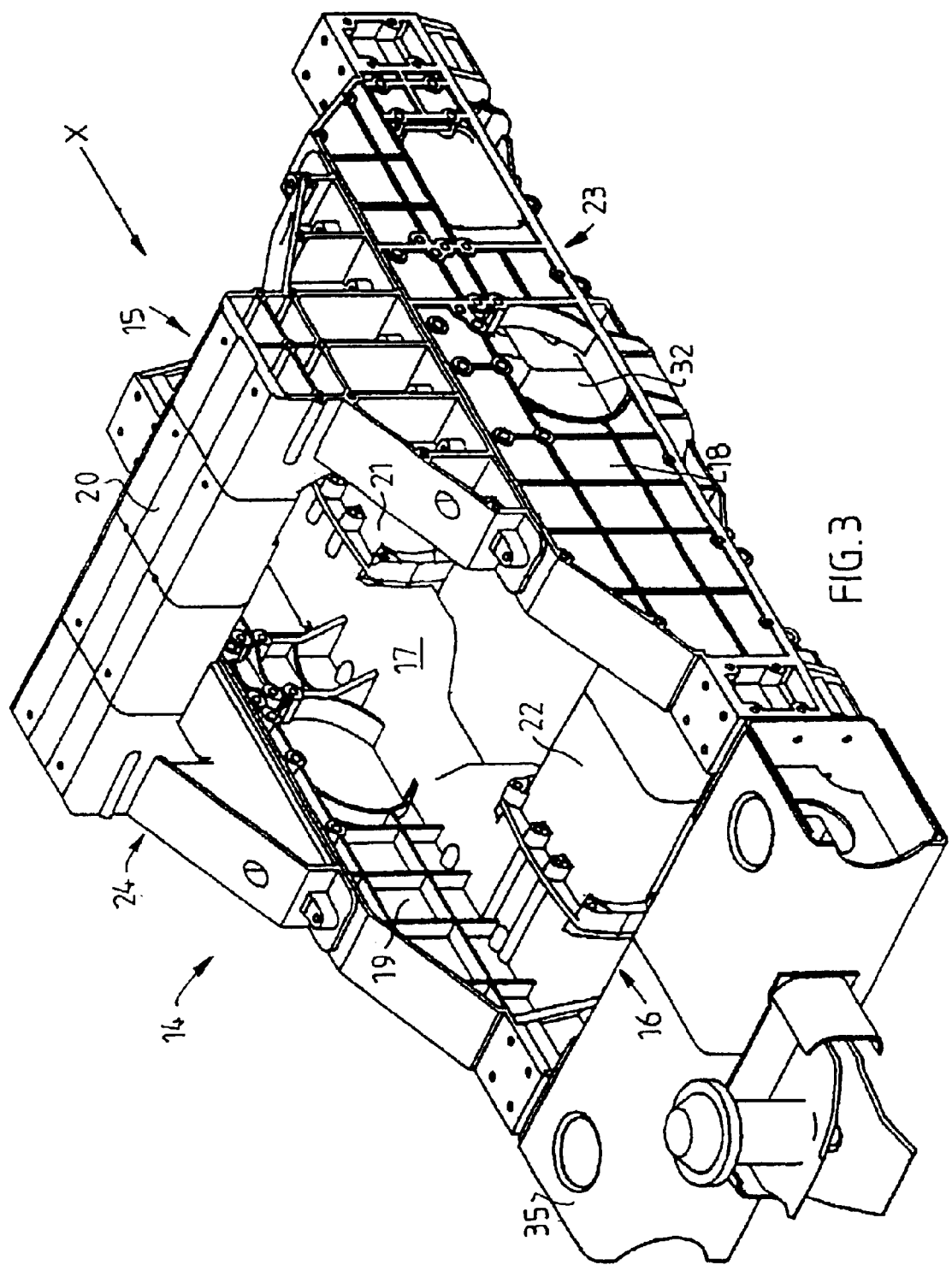
FIG. 3 shows a perspective view of a frame structure of a rear axle arrangement according to the invention.

As better indicated in FIG. 3, the frame structure 14 has a first end region 15 designed to be connected to the chassis elements of the vehicle 5, and a second end region 16. The frame structure 14 forms a space 17 which extends from the first end region 15 to the second end region 16 in the vehicle's longitudinal direction x. The space 17 is surrounded by two side portions 18, 19, an upper portion 20 and two lower portions 21, 22. All the portions 18, 19, 20, 21, 22 preferably incorporate aluminium castings with a view to achieving a lightweight frame structure.

The portions 18, 19, 20, 21, 22 form, as viewed in the longitudinal direction x of the vehicle 1, a substantially quadrilateral frame round the space 17. As mentioned previously, the walls 6, 7, 8, 9 of the chassis element 5, as viewed in the longitudinal direction x of the vehicle 1, form a substantially quadrilateral frame round said hollow which extends along the whole length of the chassis element 5. Adapting the lengths of the portions 18, 19, 20, 21, 22 to the transverse lengths of the walls 6, 7, 8, 9 enables the frame structure 14 to be connected to the chassis element 5 by the first end region 15 of the frame structure 14 being inserted a short distance into said chassis element 5 so that the walls 6, 7, 8, 9 of the chassis element 5 abut to a corresponding extent against the portions 18, 19, 20 and possibly the portion 21 of the frame structure 14 and a number of bolts can extend through said walls 6, 7, 8, 9 of the chassis element 5 into the portions 18, 19, 20 and possibly the portion 21 of the frame structure 14 and connect the frame structure 14 to the chassis element 5.

As indicated in FIG. 3, each side portion 18, 19 has a lower section 23 and an upper section 24. In addition, the lower sections 23 of the side portions 18, 19 are of greater extent in the longitudinal direction x than the upper section 24, i.e. the side portions 18, 19 narrow from the lower section 23 to the upper section 24, where they are connected to the upper portion 20. The first lower portion 21 is arranged adjacent to the first end region 15 of the frame structure 14, and the second portion 22 is arranged adjacent to the second end region 16 of the frame structure 14.

As previously mentioned, each rear axle unit 13 incorporates two wheels 25 depicted in FIG. 1. FIG. 2 omits the wheels 25 so that their suspension is depicted more clearly. FIG. 2 shows only the wheel hub 26 to which the wheel 25 is intended to be fitted. The wheel hubs 26 incorporate in a conventional manner brake discs, brake pads and other equipment for the braking of the vehicle 1. These components will not be described in more detail. References hereinafter to the wheels 25 include also wheel hubs, brake discs, brake pads etc. Each wheel 25 is individually suspended in the frame structure 14 of each rear axle unit 13. Each suspension incorporates a lower link arm 27 and an upper link arm 28. Each of the lower link arms 27 is pivotingly connected to a respective side portion 18, 19 in the vicinity of the lower section 23 of the respective side portion 18, 19 and to a respective wheel 25. Each of the upper link arms 28 is pivotingly connected to the respective side portion 18, 19 via a fastening device 29, and to a respective wheel 25. Each suspension also incorporates a spring device 30 which is connected to a respective end of the upper portion 20 via a fastening device 29 and a respective lower link arm 27. Each spring device 30 incorporates a spring function and a shock-absorber function. The wheels 25 of each rear axle unit 13 are thus suspended entirely individually, which means that road surface unevenness with respect to one of these four wheels 25 results only in movement of that wheel 25 and not of the other wheels 25 of the rear axle units 13. The vertical forces arising from such unevenness will be absorbed by the respective frame structure of the rear axle unit 13.

As may be seen in FIG. 2, the wheels 25 of each rear axle unit 13 are powered. A differential gear 31 is arranged in the space 17 of the respective frame structure 14. In addition, an aperture 32 is arranged in each side portion 18, 19 of the respective frame structure 14 to make it possible for a driveshaft 33 to extend from the respective wheel 25 through the aperture 32 of the respective side portion 18, 19 to the differential gear 31 which is arranged in the space 17 of the respective frame structure 14. A drive connection 34 connects the two differential gears 31.

Each rear axle unit 13 may incorporate a set of steering gear (not depicted) which makes steering of the wheels 25 of the respective rear axle unit 13 possible via a line arrangement.

Figure 4:
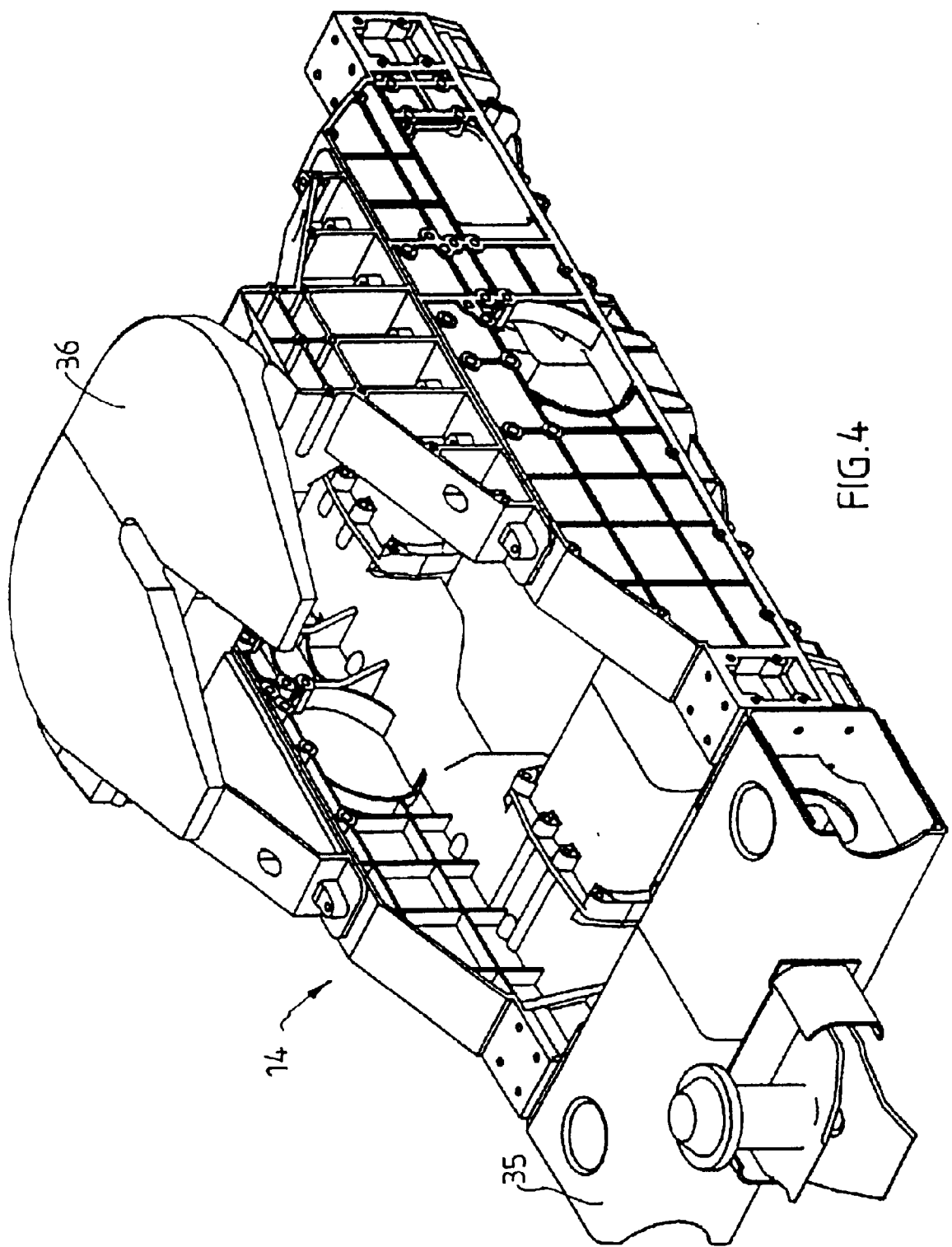
FIG. 4 shows a perspective view of a frame structure of a rear axle arrangement according to the invention.

In FIG. 3, a towbar 35 is directly connected to the second end region 16 of the frame structure 14 via the ends of the side portions 18, 19 in the vicinity of the respective lower sections 22 of the side portions 18, 19. The towbar 35 is designed to make it possible to attach a trailer vehicle. The frame structure 14 may also incorporate a coupling device 36 in the form of a turntable on the same side as the towbar 35, as depicted in FIG. 4. Such a turntable is used when a so-called semitrailer which only incorporates a rear axle arrangement is coupled to a truck. As may be seen in FIG. 4, the coupling device 36 replaces the upper portion 20 of the frame structure 14 in FIG. 3. It should be noted that a war axle unit need not incorporate both a towbar and a coupling device in the form of a turntable as depicted in FIG. 4 but may incorporate only one of these alternatives. A coupling device 36 in the form of a turntable arranged as depicted in FIG. 4 is used where a rear axle arrangement according to the invention incorporates only one rear axle unit.

The invention is not limited to the embodiment depicted but may be varied and modified within the scopes of the patent claims below.

What is claimed is:

1. A rear axle arrangement for a heavy vehicle, wherein the vehicle includes an elongated chassis element which extends in a longitudinal direction of the vehicle from front to rear;

the rear axle arrangement includes at least two separate rear axle units, each rear axle unit including a load bearing frame and two wheels respectively at lateral sides of the rear axle arrangement; one of the rear axle units is forward toward the chassis element;

each rear axle unit frame having a forward end region and a rearward end region in the longitudinal direction of the vehicle, the forward end region of the forward one of the frames being adapted to connect to the chassis element; each rear axle unit is a substantially self-supporting axle module such that the rear axle units may be connected to each other by the respective frames of the rear axle units being connected to each other;

the two wheels of each rear axle unit are suspended on the respective frame of the unit;

at least the forward one of the frames is shaped to define a space which extends through at least the forward one of the frames in the longitudinal direction of the vehicle;

to define the space, each frame includes first and second lateral side portions which are spaced apart from each other, are upstanding and extend in the longitudinal direction of the chassis element; an upper portion connecting the side portions; and a lower portion below the upper portion and also connecting the side portions, wherein the side portions, upper portion and lower portion together surround and define the space; and each side portion has a lower section and an upper section, each lower section of the side portion is of greater extent in the longitudinal direction than the respective upper section thereof.

2. The rear axle arrangement of claim 1, wherein the portions of each frame are so shaped and oriented so as to form a substantially quadrilateral frame around the space.

3. The rear axle arrangement of claim 1, wherein for each frame there are two of the lower portions connecting the side portions, with a first one of the lower portions adjacent to the front end region of the frame and the second lower portion adjacent to the rear end region of the frame.

4. The rear axle arrangement of claim 1, further comprising an individual suspension in each frame for each of the two wheels.

5. The rear axle arrangement of claim 1, wherein the wheels of at least one of the rear axle units are powered wheels; a differential gear connected with the powered wheels and arranged in the respective frame of the at least one rear axle unit.

6. The rear axle arrangement of claim 5 further comprising an aperture through each of the side portions of each frame; a respective drive shaft extending between the differential gear and the respective wheel and extending through the aperture in the respective side portion of each frame.

7. The rear axle arrangement of claim 1, further comprising a towbar connected to the rearward one of the frames, the towbar being attachable to a trailing vehicle.

8. The rear axle arrangement of claim 1, further comprising a coupling device located at the a rearward one of the rear axle units for attaching a trailing vehicle.

9. The rear axle arrangement of claim 1, further comprising a coupling device located at a rearward one of the rear axle units for attaching a trailing vehicle; the coupling device being defined by the upper portion of the frame of the rearward rear axle unit.

10. A rear axle arrangement for a heavy vehicle, wherein the vehicle includes an elongated chassis element which extends in a longitudinal direction of the vehicle from front to rear;

the rear axle arrangement includes at least two separate rear axle units, each rear axle unit including a load bearing frame and two wheels respectively at lateral sides of the rear axle arrangement; one of the rear axle units is forward toward the chassis element;

each rear axle unit frame having a forward end region and a rearward end region in the longitudinal direction of the vehicle, the forward end region of the forward one of the frames being adapted to connect to the chassis element; each rear axle unit is a substantially self-supporting axle module such that the rear axle units may be connected to each other by the respective frames of the rear axle units being connected to each other;

the two wheels of each rear axle unit are suspended on the respective frame of the unit;

the respective individual suspension for each of the two wheels of each frame comprises a lower link arm and an upper link arm which is above the lower link arm and connected to the wheel, and the lower and upper link arms both being pivotally connected to each frame; and further comprising an individual suspension in each frame for each of the the two wheels.

11. The rear axle arrangement of claim 10, wherein the upper and lower link arms are pivotally connected to the respective side portion of each frame at the same lateral side of the frame as the respective wheel.

12. The rear axle arrangement of claim 10, wherein the rear axle unit further comprises a respective spring for each of the wheels, and the spring is connected between the upper portion of the respective one of the frames and the respective lower link arm for the wheel.

* * * * *